United States Patent
Hasegawa et al.

(10) Patent No.: US 12,271,183 B2
(45) Date of Patent: Apr. 8, 2025

(54) CONTROLLER AND CONTROL METHOD

(71) Applicant: YOKOGAWA ELECTRIC CORPORATION, Musashino (JP)

(72) Inventors: Yuuzou Hasegawa, Tokyo (JP); Kazuyuki Ito, Tokyo (JP); Hideharu Yajima, Tokyo (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 237 days.

(21) Appl. No.: 17/688,153

(22) Filed: Mar. 7, 2022

(65) Prior Publication Data

US 2022/0308563 A1 Sep. 29, 2022

(30) Foreign Application Priority Data

Mar. 29, 2021 (JP) ................. 2021-055879

(51) Int. Cl.
*G05B 19/418* (2006.01)

(52) U.S. Cl.
CPC ... *G05B 19/41865* (2013.01); *G05B 19/4183* (2013.01); *G05B 19/4185* (2013.01)

(58) Field of Classification Search
CPC .......... G05B 19/41865; G05B 19/4183; G05B 19/4185; G05B 19/0421; G05B 19/0428; G05B 9/03; G05B 2219/24182
See application file for complete search history.

(56) References Cited

U.S. PATENT DOCUMENTS

| 6,845,467 B1 * | 1/2005 | Ditner ................ G05B 19/0428 714/10 |
| 2005/0240812 A1 | 10/2005 | Anderson et al. |
| 2007/0240016 A1 * | 10/2007 | Anderson ............... G06F 11/20 714/11 |

(Continued)

FOREIGN PATENT DOCUMENTS

| EP | 3285127 A1 | 2/2018 |
| JP | H05-143103 A | 6/1993 |

(Continued)

OTHER PUBLICATIONS

Office Action dated Sep. 5, 2023, issued in counterpart JP application No. 2021-055879, with English translation. (6 pages).

(Continued)

*Primary Examiner* — Christopher E. Everett
(74) *Attorney, Agent, or Firm* — WHDA, LLP

(57) ABSTRACT

A controller is a controller forming, with another controller, a redundant controller. The controller includes a communication function unit that performs communication with an external device capable of executing control calculation needed for process control for a plant, and a redundancy management unit that switches states of the controller between an active state where a result of the control calculation obtained from the external device via the communication function unit is reflected in the process control and a standby state where the result of the control calculation is not reflected in the process control. The redundancy management unit switches the states of the controller to bring one of the controller and the another controller into the active state.

12 Claims, 8 Drawing Sheets

(56) References Cited

U.S. PATENT DOCUMENTS

| | | | |
|---|---|---|---|
| 2013/0211555 A1* | 8/2013 | Lawson | G06F 9/5072 |
| | | | 700/28 |
| 2015/0378356 A1 | 12/2015 | Hefeeda et al. | |
| 2016/0274552 A1* | 9/2016 | Strohmenger | G06Q 10/06 |
| 2018/0052451 A1 | 2/2018 | Billi-Duran et al. | |
| 2018/0225244 A1* | 8/2018 | Dorneanu | G06F 13/374 |
| 2022/0147022 A1 | 5/2022 | Yoneda et al. | |

FOREIGN PATENT DOCUMENTS

| | | |
|---|---|---|
| JP | 2003-036122 A | 2/2003 |
| JP | 4099816 B2 | 6/2008 |
| JP | 2010-57307 A | 3/2010 |
| JP | 2010-97471 A | 4/2010 |
| WO | 2020/184086 A1 | 9/2020 |

OTHER PUBLICATIONS

Extended (Supplementary) European Search Report dated Jul. 22, 2022, issued in counterpart EP Application No. 22160750.0. (13 pages).
Office Action dated May 9, 2023, issued in counterpart JP Application No. 2021-055879, with English translation. (6 pages).
Office Action dated Nov. 21, 2024, issued in counterpart CN application No. 202210207845.2, with English translation. (22 pages).

* cited by examiner

CONTROLLER AND CONTROL METHOD

CROSS-REFERENCE TO RELATED APPLICATION

The present application claims priority to and incorporates by reference the entire contents of Japanese Patent Application No. 2021-055879 filed in Japan on Mar. 29, 2021.

FIELD

The present invention relates to controllers and control methods.

BACKGROUND

Controllers that perform process control for plants by using control calculation results have been known (see, for example, Japanese Patent No. 4099816).

A redundant configuration using two controllers may sometimes be adopted. One of the controllers is in an active state and the other controller is in a standby state. When an abnormality occurs, the controller in the standby state is switched to the active state as needed. However, because this switching rarely occurs and the utilization rate of the controller in the standby state is very low, the redundant configuration is not cost-effective.

An object of the present invention is to reduce the cost for redundancy generation in a controller.

SUMMARY

According to one aspect of embodiments, a controller forms, with another controller, a redundant controller, the controller comprises a communication function unit that performs communication with an external device that is capable of executing control calculation needed for process control for a plant; and a redundancy management unit that switches states of the controller between plural states including an active state where a result of the control calculation obtained from the external device via the communication function unit is reflected in the process control and a standby state where the result of the control calculation is not reflected in the process control, wherein the redundancy management unit switches the states of the controller to bring one of the controller and the another controller into the active state.

According to one aspect of embodiments, a control method by a controller forming, with another controller, a redundant controller, the control method includes performing communication with an external device that is capable of executing control calculation needed for process control for a plant; and switching states of the controller between plural states including an active state where a result of the control calculation obtained from the external device via the communication is reflected in the process control and a standby state where the result of the control calculation is not reflected in the process control, wherein in the switching, the states of the controller are switched to bring one of the controller and the another controller into the active state.

DESCRIPTION OF EMBODIMENTS

Embodiments of the present invention will hereinafter be described while reference is made to the drawings. The same reference signs will be assigned to elements that are the same and any overlapping explanation will be omitted as appropriate.

Figure 1:
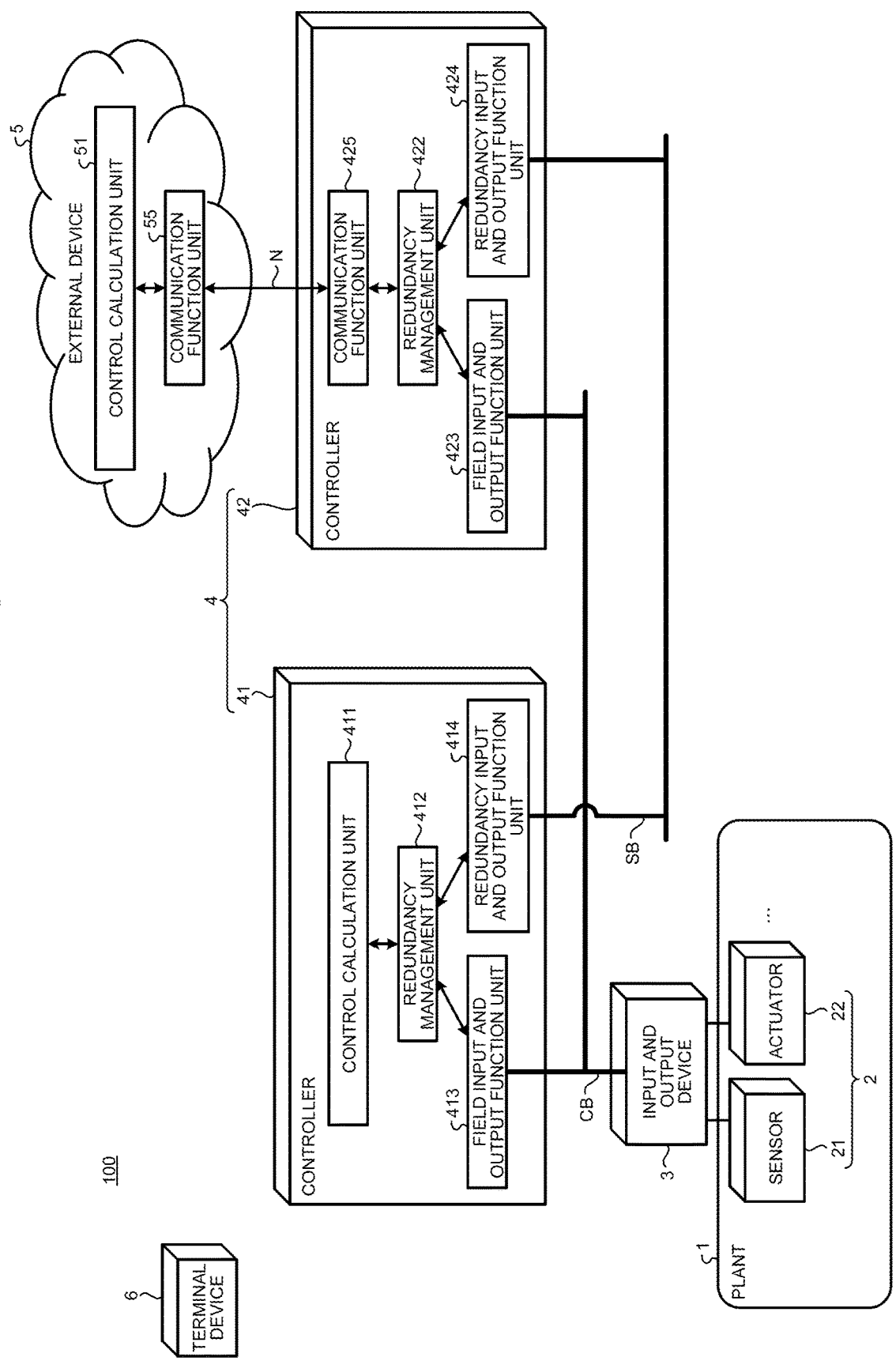
FIG. 1 is a diagram illustrating an example of a schematic configuration of a redundant controller for which a controller according to an embodiment is used.

FIG. 1 is a diagram illustrating an example of a schematic configuration of a redundant controller for which a controller according to an embodiment of the present invention is used. A redundant controller 4 illustrated in FIG. 1 as an example is applied to a control system 100. The control system 100 is used to control a plant 1.

The redundant controller 4 executes process control (such as operation control) for the plant 1. The plant 1 has various field devices 2 provided in the plant 1. A sensor 21 and an actuator 22 are illustrated in FIG. 1 as examples of the field devices 2.

The field devices 2 are connected to an input and output device 3. The input and output device 3 transfers data between the field devices 2 and the redundant controller 4, which will be described later. For example, in response to a request from the redundant controller 4, the input and output device 3 obtains control data from the field devices 2 and sends the control data to the redundant controller 4. Furthermore, the input and output device 3 receives control data from the redundant controller 4 and provides the control data to the field devices 2. The control data (such as a control calculation result described later), is thereby reflected in the process control for the plant 1.

The "control data" includes process data and control parameters. Examples of the process data include results of detection by the sensor 21 (for example, pressures, temperatures, and flow rates). Examples of the control parameters include parameters set for operation control for the plant 1 and are, for example, set values for the actuator 22. Because control data is obtained from the field devices 2 via the input and output device 3 and control data is provided to the field devices 2, "control data" may be referred to as "input and output data" in the present disclosure.

The control system 100 includes the redundant controller 4, an external device 5, and a terminal device 6. The above described field devices 2 and/or input and output device 3 may also be a component or components of the control system 100.

By using a result of control calculation described later, the redundant controller 4 executes process control for the plant 1. The redundant controller 4 is communicably connected to the input and output device 3 to be able to obtain data from the field devices 2 and provide data to the field devices 2.

Communication lines that connect between the redundant controller 4 and the input and output device 3 are illustrated in the drawings and referred to as a control bus CB.

The redundant controller 4 has a configuration that has been made redundant (a redundant configuration), to meet a high standard of availability. Availability herein means the ability to continue to be in operation even when some kind of abnormality occurs. The redundant controller 4 is made redundant by including plural controllers that are each able to execute process control for the plant 1.

Specifically, the redundant controller 4 includes a controller 41 and a controller 42. Of the controller 41 and controller 42 forming the redundant controller 4, for example, the controller 42 may be the controller according to the embodiment. From the perspective of the controller 42, the controller 41 is another controller forming the redundant controller 4. The controller 41 is a first controller for executing process control for the plant 1 by using a result of control calculation. The controller 42 is a second controller for executing process control for the plant 1 by using a result of control calculation.

Each of the controller 41 and the controller 42 is connected to the input and output device 3 via the control bus CB. Each of the controller 41 and the controller 42 is thereby able to transmit and receive control data to and from the input and output device 3.

The controller 41 and the controller 42 are connected to each other via a system bus SB. Various sets of data needed for redundancy generation are transmitted and received between the controller 41 and the controller 42. Details thereof will be described later.

The controller 41 includes a control calculation unit 411, a redundancy management unit 412, a field input and output function unit 413, and a redundancy input and output function unit 414. The controller 42 includes a redundancy management unit 422, a field input and output function unit 423, a redundancy input and output function unit 424, and a communication function unit 425.

The control calculation unit 411 of the controller 41 executes control calculation needed for process control. Various kinds of control calculation related to process control may be executed. Examples of the control calculation include PID control using control data. Various kinds of control prescribed in a given control application, for example, may be included in the control calculation. The plant 1 is actually controlled by a result of the control calculation (a control calculation result) being reflected in process control for the plant 1 (being transmitted to the input and output device 3 and provided to the sensor 21).

The redundancy management unit 412 of the controller 41 and the redundancy management unit 422 of the controller 42 are units that manage redundancy generation and execute various processes needed for the redundancy generation. Some examples of specific processes will now be described.

Examples of processes executed by the redundancy management unit 412 and the redundancy management unit 422 include equalization. This equalization includes copying data needed for control calculation from one of the controller 41 and the controller 42 to the other one of the controller 41 and the controller 42. Examples of the data needed for control calculation include control data (input and output data) and internal data needed for the control calculation. This equalization allows the data needed for the control calculation to be shared between (to be common to) the controller 41 and the controller 42.

Obtainment of a result of control calculation is another example of the processes executed by the redundancy management unit 412 and the redundancy management unit 422. The redundancy management unit 412 is capable of obtaining a result of control calculation from the control calculation unit 411. The control calculation unit 411 requests the redundancy management unit 412 for input and output data (control data) needed for control calculation. The redundancy management unit 412 provides the input and output data requested, to the control calculation unit 411. By using the input and output data received, the control calculation unit 411 executes control calculation and provides a result of the control calculation to the redundancy management unit 412. The redundancy management unit 422 is thus able to obtain the result of the control calculation from the external device 5. Furthermore, the redundancy input and output function unit 424 is capable of obtaining a result of control calculation from a control calculation unit 51 of the external device 5 described later. This will be described again later.

Abnormality detection for the controller 41 and the controller 42 is another example of the processes executed by the redundancy management unit 412 and the redundancy management unit 422. Examples of the abnormality detection include loss-of-synchronization detection. For example, the redundancy management unit 412 and the redundancy management unit 422 control the controller 41 and the controller 42 to cause the controller 41 and the controller 42 to operate in synchronization with each other. The method of synchronization is not particularly limited, but a step count (see also Japanese Patent No. 4099816) method may be used, for example. In this step count method, the controller 41 and the controller 42 notify each other of the number of steps executed. A program that executes synchronous processing by software itself may be prepared and the software may execute the synchronous processing. Information needed for synchronization is exchanged via the system bus SB. Without being limited to these examples, various kinds of abnormality detection may be adopted.

Control of states of the controller 41 and the controller 42 is another example of the processes executed by the redundancy management unit 412 and the redundancy management unit 422. For example, the redundancy management unit 412 and the redundancy input and output function unit 424 control which ones of plural states the controller 41 and the controller 42 are to be in.

Examples of the plural states include an active state, a standby state, and a stopped state. The active state is a state where a result of control calculation obtained at the controller in that state is reflected in process control for the plant 1 (transmitted to the input and output device 3 and provided to the field devices 2). The standby state is a state where a result of control calculation that is able to be obtained at the controller in that state is not reflected in the process control for the plant 1 (not transmitted to the input and output device 3 and not provided to the field devices 2). The stopped state is a state where a result of control calculation is not obtained by the controller in that state.

Switching between states of the controller 41 and the controller 42 is another example of the processes executed by the redundancy management unit 412 and the redundancy management unit 422. Explanation will now be made separately for the controller 41 and the controller 42.

By obtaining a result of control calculation from the control calculation unit 411 and reflecting the obtained result of control calculation in process control for the plant 1 (transmitting the result to the input and output device 3 via the redundancy input and output function unit 414), the redundancy management unit 412 in the controller 41 switches the controller 41 to the active state. By not reflecting the result of control calculation by the control calculation unit 411 in the process control for the plant 1, the redundancy management unit 412 switches the controller 41 to the standby state. In the standby state, the result of control calculation by the control calculation unit 411 may be obtained or not obtained by the redundancy management unit 412. By not obtaining the result of control calculation from the control calculation unit 411 and not reflecting (of course) the result in the process control either, the redundancy management unit 412 switches the controller 41 to the stopped state. In the stopped state, the control calculation itself by the control calculation unit 411 may be not executed (may be stopped).

By obtaining a result of control calculation from the external device 5 described later and reflecting the obtained result of control calculation in process control for the plant 1, the redundancy management unit 422 in the controller 42 switches the controller 42 to the active state. By not reflecting the result of control calculation by the control calculation unit 51 of the external device 5 described later, the redundancy management unit 422 switches the controller 42 to the standby state. In the standby state, the result of control calculation by the control calculation unit 51 of the external device 5 may be obtained or not obtained by the redundancy management unit 412. By not obtaining the result of control calculation from the external device 5 and not reflecting the result in the process control either, the redundancy management unit 422 switches the controller 42 to the stopped state. In the stopped state, the control calculation itself by the control calculation unit 51 of the external device 5 may be not executed (may be stopped).

Examples of the switching will now be described. The redundancy management unit 412 of the controller 41 and the redundancy management unit 422 of the controller 42 switch states of the controller 41 and the controller 42 to bring one of the controller 41 and the controller 42 into the active state. For example, the redundancy management unit 412 and the redundancy input and output function unit 424 switch states of the controller 41 and the controller 42 in response to detection of an abnormality (in response to occurrence of an abnormality). For example, in response to an abnormality that occurs in a controller in the active state, a controller in the standby state is switched to the active state. In such determination for switching, a self-diagnosis result described later may be considered.

Without being limited to the above described example, any of various switching methods may be used. Connecting the controller 41 and the controller 42 via the system bus SB dedicated thereto and including functions related to redundancy generation (the redundancy management unit 412 and the redundancy management unit 422, for example) in these controllers 41 and 42 enable prompt abnormality detection and switching.

A configuration described above and having a function related to redundancy generation in the controller 41 and the controller 42 connected via the system bus SB may hereinafter be referred to as a "dedicated hardware configuration".

Self-diagnosis is another example of the processes executed by the redundancy management unit 412 and the redundancy management unit 422. Examples of the self-diagnosis include identification of a cause of an abnormality and whether or not process control for the plant 1 is possible (whether or not switching from the active state to the standby state is needed). Mutual notification of a result of the self-diagnosis may be performed via the system bus SB. The respective results of the self-diagnosis are thereby perceived (shared) by the redundancy management unit 412 of the controller 41 and the redundancy management unit 422 of the controller 42.

Without being limited to the above described examples, various types of self-diagnosis may be adopted. By including the above described dedicated hardware configuration, the results of the self-diagnosis are able to be promptly shared between the controller 41 and the controller 42. The cause of the abnormality and whether or not the switching is needed are thereby able to be determined promptly, for example.

The field input and output function unit 413 and the field input and output function unit 423 transmit and receive input and output data (control data) to and from the input and output device 3 via the control bus CB. For example, the field input and output function unit 413 or the field input and output function unit 423 requests the input and output device 3 for input and output data. The input and output device 3 obtains the input and output data requested, from the field devices 2, and transmits the input and output data to the field input and output function unit 413 or the field input and output function unit 423. Furthermore, the field input and output function unit 413 or the field input and output function unit 423 transmits input and output data to be provided to the field devices 2, to the input and output device 3. The input and output device 3 provides the input and output data received, to the field devices 2 to have the input and output data reflected in process control for the plant 1.

Transmission and reception of input and output data between the controller 41 and the input and output device 3 and transmission and reception of input and output data between the controller 42 and the input and output device 3 are performed exclusively. Specifically, only the controller that is in the active state performs transmission and reception of input and output data to and from the input and output device 3. The controller that is in the standby state obtains input and output data from the controller that is in the active state, by the above described equalization.

The redundancy input and output function unit 414 and the redundancy input and output function unit 424 transmit and receive information respectively needed, via the system bus SB. Various types of information needed for the above described processes executed by the redundancy management unit 412 and the redundancy management unit 422 are transmitted and received via the redundancy input and output function unit 414 and the redundancy input and output function unit 424.

The communication function unit 425 of the controller 42 performs communication with the external device 5. In this example, the external device 5 is connected to the controller 42 via a network N. The external device 5 is, for example, a cloud server device that enables cloud computing. Examples of the network N include the Internet and a LAN. The network N is a communication path different from the system bus SB.

The external device 5 includes the control calculation unit 51 and a communication function unit 55. The control calculation unit 51 includes functions similar to those of the above described control calculation unit 411 of the controller 41. The communication function unit 55 performs communication with the communication function unit 425 of the controller 42.

The above described functions of the control calculation unit 411 and redundancy management unit 412 of the controller 41 are implemented by the control calculation unit 51 and communication function unit 55 of the external device 5 and the communication function unit 425 and redundancy management unit 422 of the redundant controller 4. Specifically, the control calculation unit 51 requests the redundancy management unit 422 for input and output data (control data) needed for control calculation. The redundancy management unit 422 transmits the input and output data requested, to the control calculation unit 51. The control calculation unit 51 executes control calculation by using the input and output data transmitted and transmits a result of the control calculation to the redundancy management unit 422. The redundancy management unit 422 is thus able to obtain the result of the control calculation from the external device 5. From the perspective of the control calculation unit 51 of the external device 5, functions of the redundancy management unit 422 of the redundant controller 4 can be said to be called by the communication function unit 55 of the external device 5. From the perspective of the redundancy management unit 422 of the redundant controller 4, functions of the control calculation unit 51 of the external device 5 can be said to be called by the communication function unit 425 of the redundant controller 4.

The terminal device 6 is used for a user of the control system 100 to operate the controller 41 and the controller 42, for example. The terminal device 6 is formed of a general-purpose PC, for example, and may be connected to each of the controller 41 and the controller 42 via a signal line not illustrated in the drawings. The terminal device 6 may provide an interface that receives a user operation, for example. Examples of the user operation received by the terminal device 6 include switching between states of the controller 41 and the controller 42. For example, information (such as a command) to order switching is transmitted to the redundancy management unit 412 of the controller 41 and the redundancy management unit 422 of the controller 42 from the terminal device 6 and switching is executed. Manual switching of the states of the controller 41 and the controller 42 is thereby enabled. Switching may be executed by a user operation that does not go through the terminal device 6. Examples of such a user operation include installing or uninstalling the controller 41 and the controller 42 (for example, removing or inserting a control card). For example, uninstalling the controller 41 when the controller 41 is in the active state causes detection of an abnormality in the controller 41 and thereby enables the controller 42 to be switched to the active state. A switch for switching between states may be provided in each of the controller 41 and the controller 42. By operating those switches, for example, a user is able to switch between the states of the controller 41 and the controller 42.

Including the above described controller 41 and the controller 42 generates redundancy in the redundant controller 4. The controller 42 in the redundant controller 4 does not have any control calculation function in the controller 42 but is, instead, capable of causing the control calculation unit 51 of the external device 5 to execute control calculation and obtaining a result of the control calculation. Because installation of a calculation function is not needed, functions of the controller 42 are simplified and cost of the controller 42 and cost of the redundant controller 4 are thus reduced.

The external device 5 may be implemented by use of any computing environment that enables implementation of functions of the control calculation unit 51. Using a general-purpose computer, for example, increases the possibility of further reduction in the cost for control calculation.

When having been made redundant, one of the controller 41 and the controller 42 operates in the active state and the other one of the controller 41 and the controller 42 operates in the standby state. When an abnormality occurs in the controller that is in the active state, the controller that is in the standby state is switched to the active state and the process control for the plant 1 is continued. The switching of states is executed by the dedicated hardware configuration as described above. Therefore, high-speed switching is enabled, as compared to, for example, a case where a functional block related to redundancy generation is implemented by use of a general-purpose computer (a platform) outside a controller and network communication is thus additionally needed.

FIG. 2 to FIG. 5 are flowcharts illustrating examples of processes (such as a redundancy generation method and a control method) executed in the redundant controller.

Figure 2:
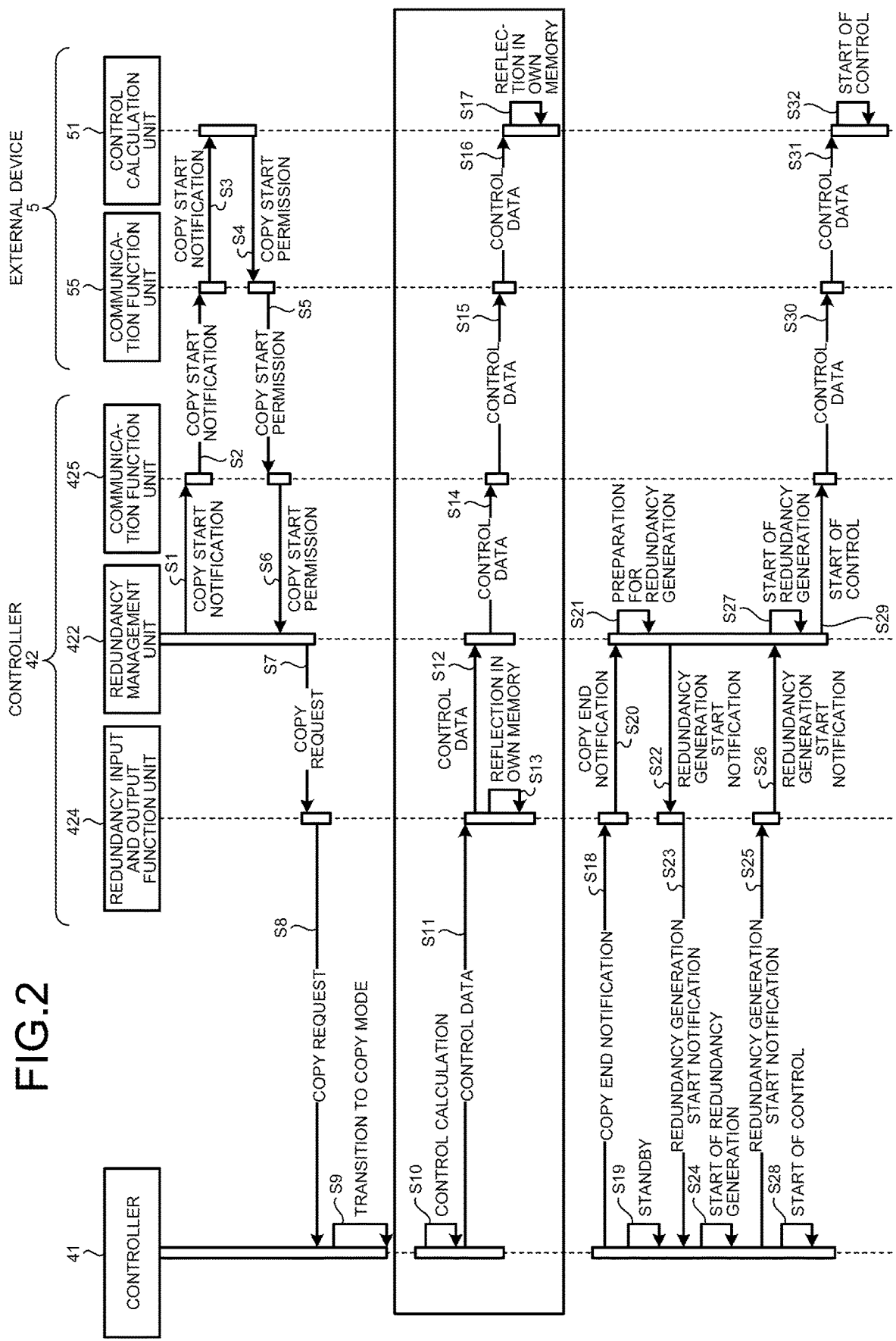
FIG. 2 is a flowchart illustrating an example of a process executed at the redundant controller.

FIG. 2 illustrates an example of operation of equalization for obtaining the redundant configuration. This operation is triggered by a user operation, for example, in a state where the controller 42, with the controller 41 in the active state, has been prepared (installed). Examples of this user operation include a user operation via the terminal device 6 described above, and an operation performed by an operator of the plant 1 while the operator is looking at a screen (such as a screen for monitoring and operating).

At Step S1 to Step S3, notification of start of copying of control data is performed. The redundancy management unit 422 of the controller 42 transmits a copy start notification to the external device 5 via the communication function unit 425. The control calculation unit 51 of the external device 5 receives the copy start notification via the communication function unit 55.

At Step S4 to Step S6, start of copying of control data is permitted. The control calculation unit 51 of the external device 5 transmits a copy start permission to the controller 42 via the communication function unit 55. The redundancy management unit 422 of the controller 42 receives the copy start permission via the communication function unit 425.

At Step S7 and Step S8, copying is requested. The redundancy management unit 422 of the controller 42 transmits a copy request to the controller 41 via the redundancy input and output function unit 424. The controller 41 receives the copy request.

At Step S9, the controller 41 undergoes transition to a copy mode. Processing at Step S10 to Step S17, which will be described next, is executed for control data to be copied, and the control data is copied from the controller 41 to the controller 42 and the external device 5 (equalization is executed).

At Step S10 and Step S11, the redundancy management unit 412 of the controller 41 transmits the control data to the controller 42 when, for example, control calculation by the control calculation unit 411 has been performed. The redundancy input and output function unit 424 of the controller 42 receives the control data.

At Step S12 and Step S13, the redundancy input and output function unit 424 of the controller 42 transfers the control data to the redundancy management unit 422 and reflects the control data in a memory thereof (for example, stores the control data into a storage device that is in the controller 42 and not illustrated in the drawings).

At Step S14 to Step S17, the redundancy management unit 422 transmits the control data to the external device 5 via the communication function unit 425. The control calculation unit 51 of the external device 5 receives the control data via the communication function unit 55 and reflects the control data in a memory thereof (for example, stores the control data into a storage device that is in the external device 5 and not illustrated in the drawings).

The above described processing at Step S10 to Step S17 allows all of the control data to be copied, from the controller 41 to the controller 42 and the external device 5. Thereafter, the process is advanced to Step S18.

At Step S18 to Step S20, notification of end of the copying is performed. The controller 41 transmits a copy end notification to the controller 42 and stands by for processing (is put on standby). The redundancy management unit 422 of the controller 42 receives the copy end notification via the redundancy input and output function unit 424.

At Step S21 to Step S27, processing is advanced toward start of redundancy generation.

The redundancy management unit 422 of the controller 42 prepares for redundancy generation and transmits a redundancy generation start notification to the controller 41 via the redundancy input and output function unit 424. The controller 41 receives the redundancy generation start notification, starts redundancy generation, and transmits the redundancy generation start notification to the controller 42. The redundancy management unit 422 of the controller 42 receives the redundancy generation start notification via the redundancy input and output function unit 424 and starts redundancy generation.

At Step S28, the controller 41 starts control. The redundancy management unit 412 of the controller 41 obtains a control calculation result from the control calculation unit 411 as done thus far. In this example, the controller 41 is in the active state and the control calculation result is reflected in process control for the plant 1.

At Step S29 to Step S32, also the controller 42 starts control. The redundancy management unit 422 of the controller 42 transmits control data to the external device 5 via the communication function unit 425. The control calculation unit 51 of the external device 5 receives the control data via the communication function unit 55 and starts control calculation by using the control data received. In this example, the controller 42 is in the standby state and a result of the control calculation is not reflected in the process control for the plant 1.

The redundant controller 4 formed of the controller 41 in the active state and the controller 42 in the standby state is obtained as described above, for example.

Figure 3:
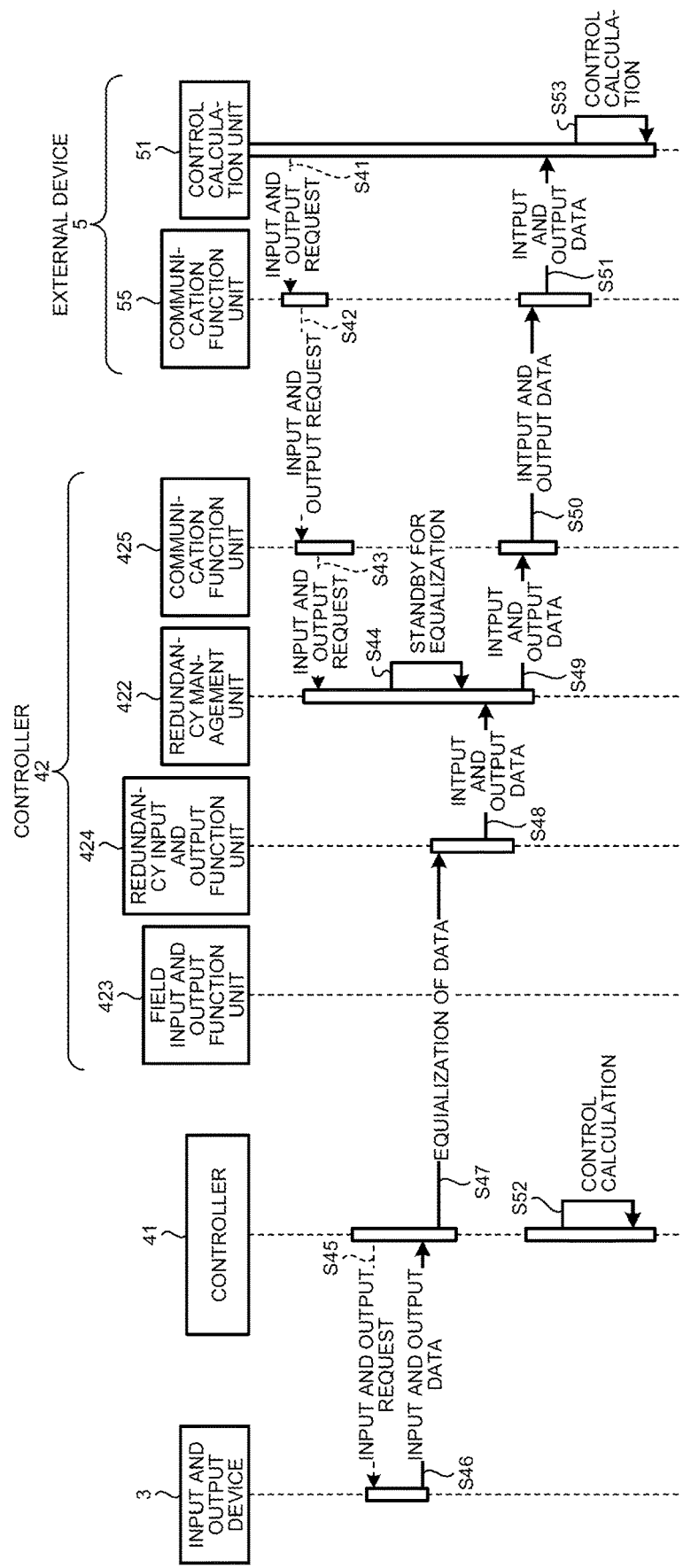
FIG. 3 is a flowchart illustrating an example of a process executed at the redundant controller.

FIG. 3 illustrates an example of a process executed when the controller 41 and the controller 42 are in the active state and the standby state.

At Step S41 to Step S44, input and output data needed for the control calculation unit 51 of the external device 5 to execute control calculation is requested. The control calculation unit 51 of the external device 5 transmits an input and output request to the controller 42 via the communication function unit 55. The redundancy management unit 422 of the controller 42 receives the input and output request via the communication function unit 425.

At Step S44, the redundancy management unit 422 of the controller 42 stands by for processing (is put on standby for equalization) until the input and output data requested is obtained by equalization.

At Step S45 and Step S46, input and output data needed for the controller 41 to execute control calculation is requested. The controller 41 transmits an input and output request to the input and output device 3. The input and output device 3 obtains, from the field devices 2, the input and output data requested, and transmits the input and output data to the controller 41. The controller 41 receives the input and output data.

At Step S47 to Step S51, the input and output data is copied from the controller 41 to the controller 42 and the external device 5. The controller 41 transmits the input and output data to the controller 42. The redundancy management unit 422 of the controller 42 receives the input and output data via the redundancy input and output function unit 424 and reflects the input and output data in a memory thereof. The redundancy management unit 422 stops being on standby for equalization and transmits the input and output data to the external device 5 via the communication function unit 425. The control calculation unit 51 of the external device 5 receives the input and output data via the communication function unit 55 and reflects the input and output data in the memory thereof.

At Step S52, the controller 41 executes control calculation. In this example, the controller 41 is in the active state and a result of the control calculation is reflected in process control for the plant 1.

At Step S53, the control calculation unit 51 of the external device 5 executes control calculation. In this example, the controller 42 is in the standby state and a result of the control calculation is not reflected in the process control for the plant 1.

Results of control calculation based on the same data are able to be obtained at both the controller 41 and the controller 42 that are in the active state and the standby state, as described above, for example. Of these, the result of the control calculation obtained at the controller 41 that is in the active state is reflected in the process control for the plant 1.

Figure 4:
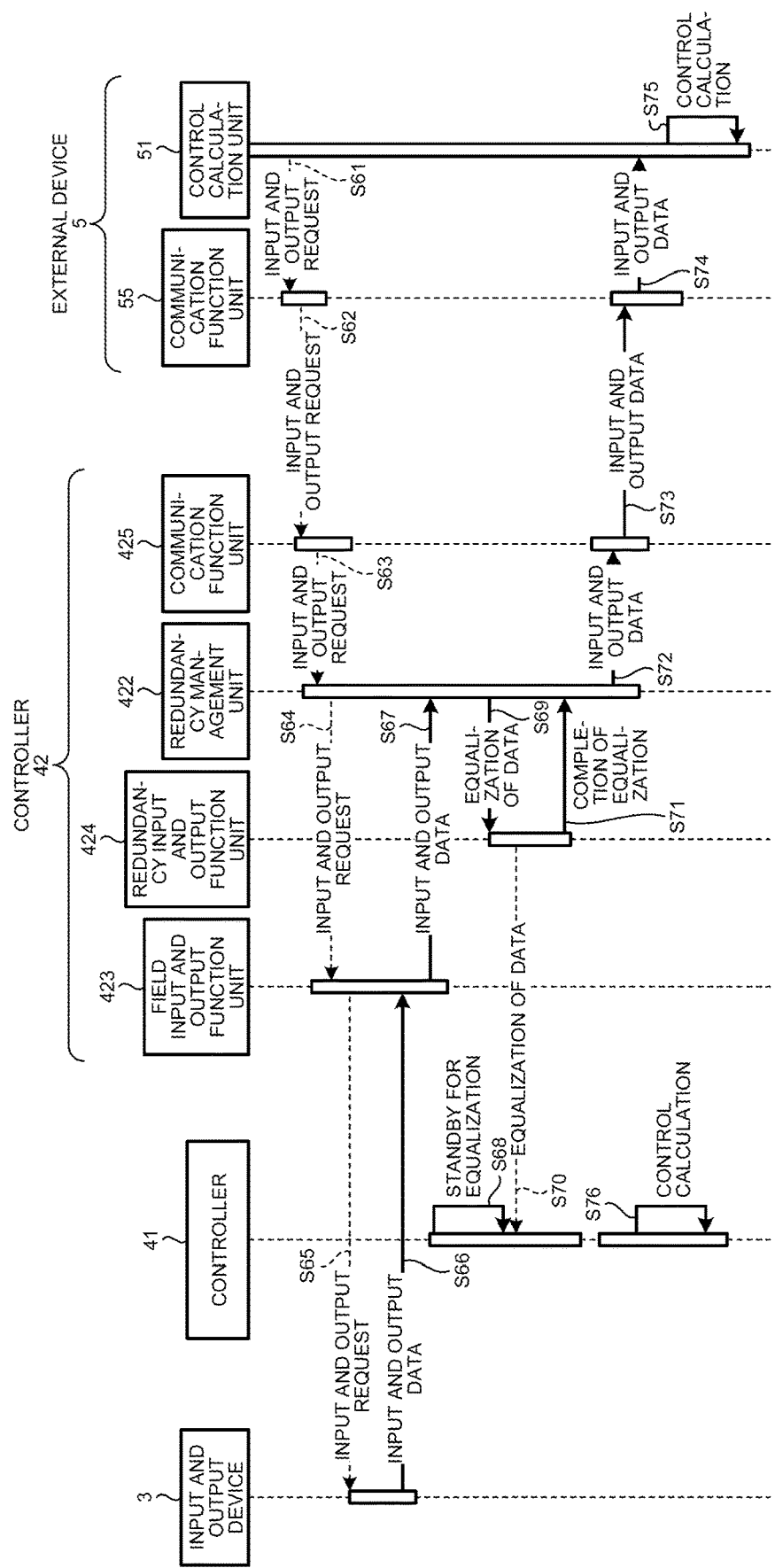
FIG. 4 is a flowchart illustrating an example of a process executed at the redundant controller.

FIG. 4 illustrates an example of a process executed when the controller 41 and the controller 42 are in the standby state and the active state.

At Step S61 to Step S67, input and output data needed for the control calculation unit 51 of the external device 5 to execute control calculation is requested and obtained. The control calculation unit 51 of the external device 5 transmits an input and output request to the controller 42 via the communication function unit 55. The redundancy management unit 422 of the controller 42 receives the input and output request via the communication function unit 425. The redundancy management unit 422 transmits the input and output request, via the field input and output function unit 423, to the input and output device 3. The input and output device 3 obtains, from the field devices 2, the input and output data requested, and transmits the input and output data to the controller 42. The redundancy management unit 422 of the controller 42 receives the input and output data via the field input and output function unit 423.

At Step S68, the controller 41 stands by for processing (is put on standby for equalization) until the input and output data needed for control calculation is obtained by equalization.

At Steps S69 to S71, equalization is executed. The redundancy management unit 422 of the controller 42 transmits the input and output data to the controller 41 via the redundancy input and output function unit 424. The controller 41 receives the input and output data and reflects the input and output data in a memory thereof (for example, stores the input and output data into a storage device in the controller 41 and not illustrated in the drawings). The redundancy input and output function unit 424 of the controller 42 notifies the redundancy management unit 422 of completion of the equalization.

At Step S72 to Step S74, the input and output data is transmitted also to the external device 5. The redundancy management unit 422 of the controller 42 transmits the input and output data to the external device 5 via the communication function unit 425. The control calculation unit 51 of the external device 5 receives the input and output data via the communication function unit 55.

At Step S75, the control calculation unit 51 of the external device 5 executes control calculation. In this example, the controller 42 is in the active state and a result of the control calculation is reflected in process control for the plant 1.

At Step S76, the controller 41 executes control calculation. In this example, the controller 41 is in the standby state and a result of the control calculation is not reflected in the process control for the plant 1.

The results of control calculation based on the same data are able to be obtained at both the controller 41 and the controller 42 that are in the standby state and the active state, as described above, for example. Of these, the result of the control calculation obtained at the controller 42 that is in the active state is reflected in the process control for the plant 1.

Figure 5:
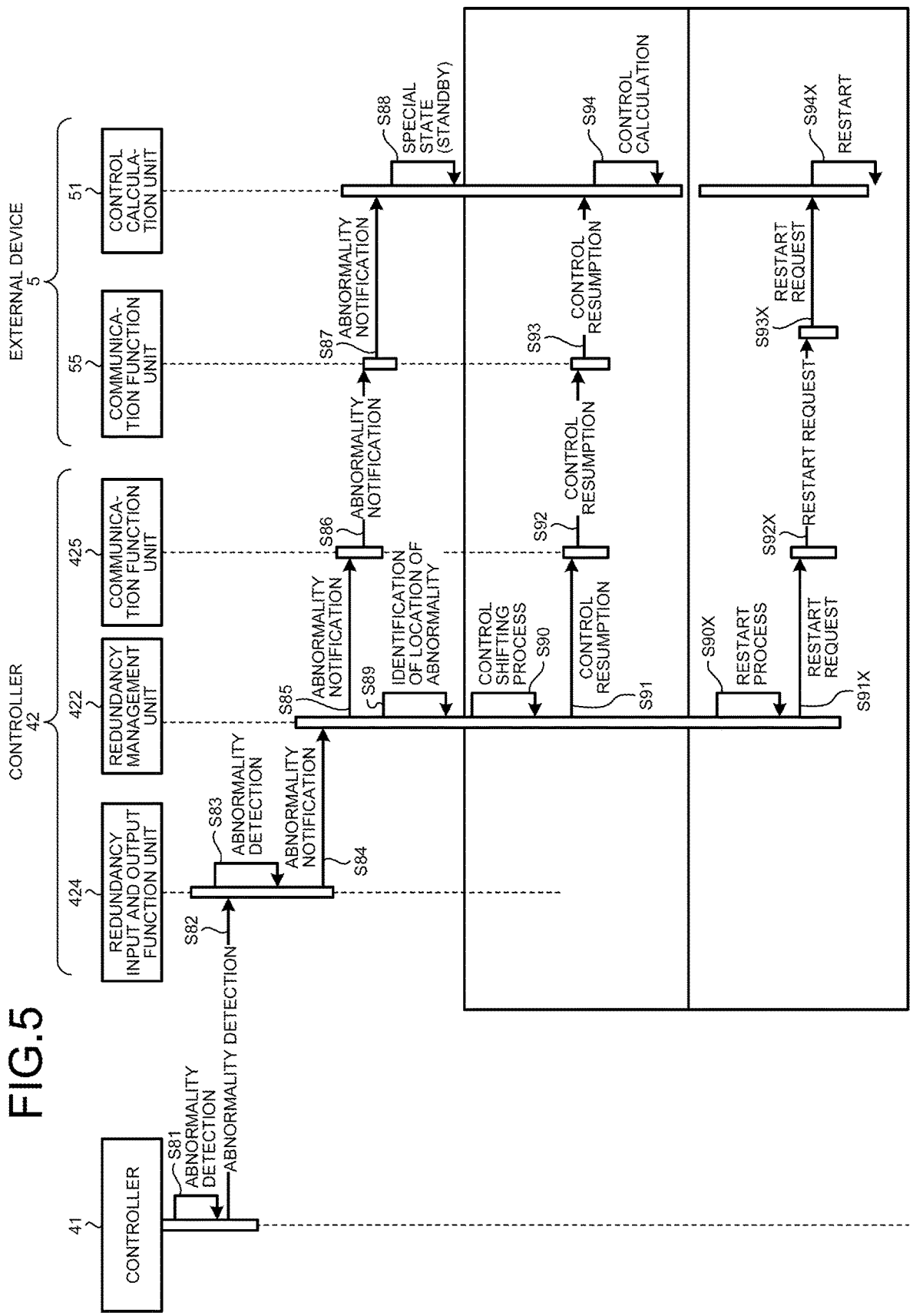
FIG. 5 is a flowchart illustrating an example of a process executed at the redundant controller.

FIG. 5 illustrates an example of a switching process at a time of occurrence of an abnormality. This process includes abnormality detection, identification of the abnormality location, and switching.

At Step S81 to Step S84, an abnormality is detected. The controller 41 transmits abnormality detection to the controller 42. The redundancy input and output function unit 424 of the controller 42 detects the abnormality by receiving the abnormality detection, and notifies the field input and output function unit 423 of the abnormality.

At Step S85 to Step S87, an abnormality notification is transmitted also to the external device 5. The redundancy management unit 422 of the controller 42 transmits the abnormality notification to the external device 5 by using the communication function unit 425. The control calculation unit 51 of the external device 5 receives the abnormality notification via the communication function unit 55.

At Step S88, the control calculation unit 51 of the external device 5 stands by for processing (is put on standby). This standby can be said to be a special state (irregular processing) caused at a time of occurrence of an abnormality.

At Step S89, by performing self-diagnosis, for example, the redundancy management unit 422 of the controller 42 identifies the location of the abnormality and makes a determination on whether or not the controller 42 is able to be switched to the active state (whether or not control is able to be shifted from the controller 41 to the controller 42).

According to a result of the above described determination by the redundancy management unit 422, later processing branches out in two ways. Processing in a case where the controller 42 is able to be switched to the active state is illustrated in FIG. 5 as Step S90 to Step S94. Processing in a case where switching is not possible is illustrated in FIG. 5 as Step S90X to Step S94X.

At Step S90 to Step S94, the controller 42 is switched to the active state. The redundancy management unit 422 of the controller 42 executes a control switching process. Specifically, the redundancy management unit 422 notifies the external device 5 of control resumption, via the communication function unit 425. The control calculation unit 51 of the external device 5 receives notification of the control resumption via the communication function unit 55 and resumes control calculation. A result of the control calculation is reflected in the process control.

At Step S90X to Step X94X, the controller 42 restarts in the standby state again. The redundancy management unit 422 of the controller 42 executes a restart process. Specifically, the redundancy management unit 422 notifies the external device 5 of a restart request, via the communication function unit 425. The control calculation unit 51 of the external device 5 receives the restart request via the communication function unit 55 and restarts. Control calculation is executed as done thus far. A result of the control calculation is not reflected in the process control.

States of the controller 41 and the controller 42 are switched as needed (according to a diagnosis result, for example) at a time of occurrence of an abnormality, as described above, for example.

In the redundant controller 4 described above, the calculation function at the controller 42 forming the redundant controller 4 is implemented by the external device 5. Cost of the controller is thus able to be reduced. Using a general-purpose computer, for example, as the external device 5 increases the possibility of reduction in cost for control calculation. Therefore, cost for redundancy generation in a controller is able to be reduced. Furthermore, installing functions related to redundancy generation (such as the redundancy management unit 412 and the redundancy management unit 422) in the controller enables high-speed switching between states of the controller 41 and the controller 42.

The redundant controller 4 is able to be implemented at lower cost than conventional controllers and the range of application is thus increased. For example, the redundant configuration may be utilized temporarily (temporary utilization). In a single configuration where process control is executed by only the controller 41 at the time of normal operation, the low-cost controller 42 may be added for implementation of the redundant configuration only when needed. As described above, the controller 42 is switched also to the stopped state where no result of control calculation is obtained (and where the control calculation itself may be not executed). Switching the controller 42 between the standby state and the stopped state enables obtainment of the redundant configuration only when the controller 42 is in the standby state (that is, temporarily). This switching may be performed at any time by a user operation, for example. That is, the redundancy management unit 412 of the controller 42 may switch the controller 42 between the standby state and the stopped state at any time when the controller 41 is in the active state. Temporary utilization of the redundant configuration is thereby enabled.

For example, the redundant configuration may be used for temporary risk avoidance. In a case where the risk changes depending on steps of the control process, the redundant configuration may be used only when the risk is comparatively high. The redundant configuration may be dynamically adopted while the operating state and the process management are monitored.

A redundant configuration may be utilized in work performed without stoppage of process control for the plant 1 (live migration). For example, implementation of a redundant configuration is achieved at low cost, the redundant configuration being needed for engineering work, such as replacement work or repair work, for a controller in which an abnormality has been identified. Work, such as update of software for the controller, is also enabled.

Fees may be set according to utilization of the external device 5. For example, a user may be charged for a fee as expenses related to the external device 5, the fee corresponding to a time period over which the functions of the control calculation unit 51 of the external device have been utilized. Adopting such a billable platform increases the possibility of further reduction in cost related to redundancy generation.

One of embodiments of the present disclosure has been described above. Techniques disclosed are not limited to the above described embodiment. Some modified examples will now be explained.

In one embodiment, a first controller may also be capable of obtaining a result of control calculation by using an external device 5. This embodiment will be described by reference to FIG. 6.

Figure 6:
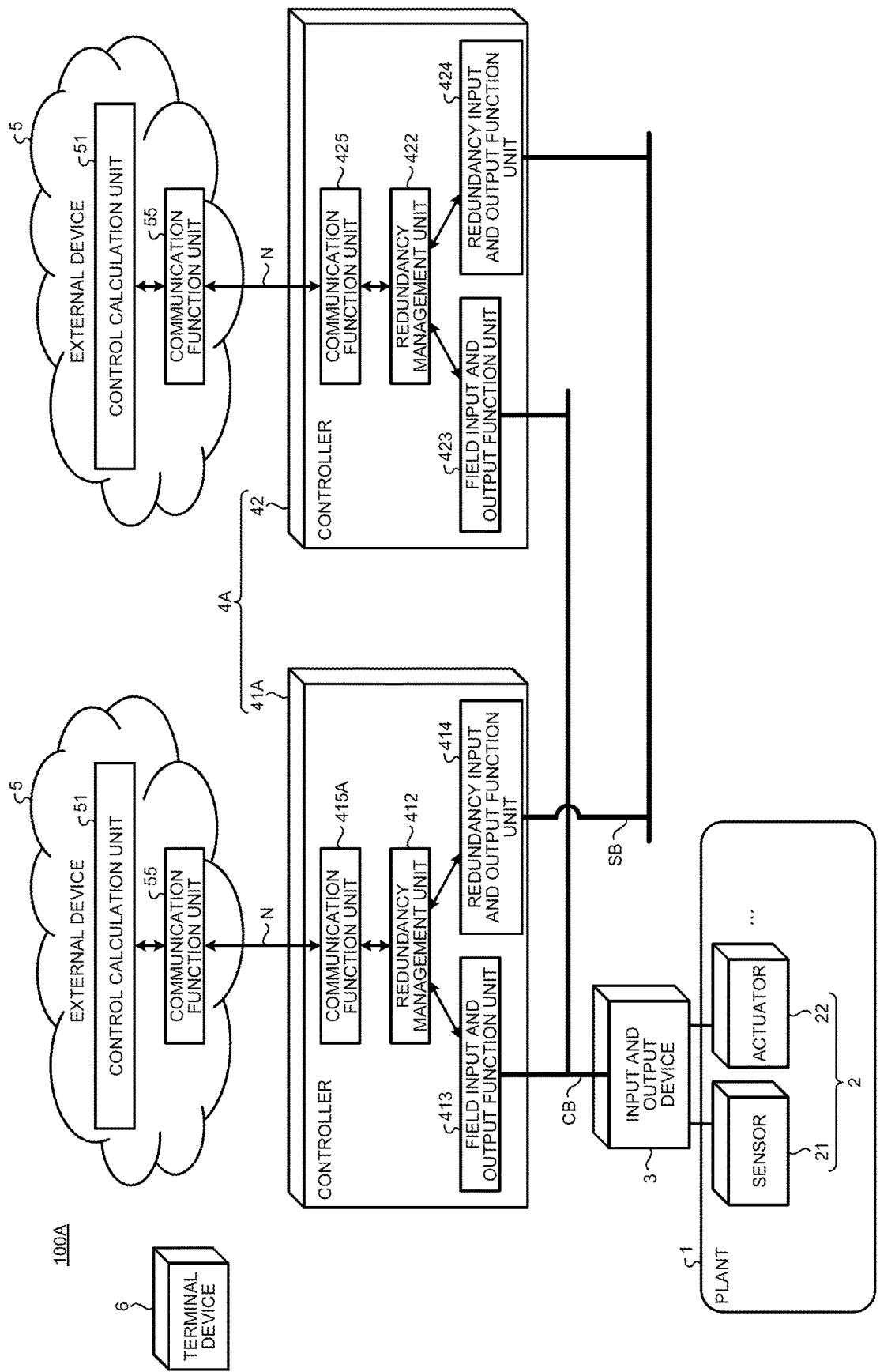
FIG. 6 is a diagram illustrating an example of a schematic configuration of a redundant controller according to a modified example.

FIG. 6 is a diagram illustrating an example of a schematic configuration of a redundant controller according to a modified example. A redundant controller 4A of a control system 100A illustrated as an example includes a controller 41A and a controller 42. The controller 41A is different from the controller 41 (FIG. 1) in that the controller 41A does not include the control calculation unit 411 but includes a communication function unit 415A instead. The communication function unit 415A has functions similar to those of the communication function unit 425 of the controller 42. The controller 41A and the controller 42 respectively communicate with their corresponding external devices 5. The redundant controller 4A enables further cost reduction because installation of the calculation function is not needed in the controller 41A either. Functions of the external device 5 corresponding to the controller 41A (a control calculation unit 51 and a communication function unit 55) and functions of the external device 5 corresponding to the controller 42 may be integrated into a single external device.

In one embodiment, external devices may be capable of executing plural different sets of control calculation. This embodiment will be described by reference to FIG. 7.

Figure 7:
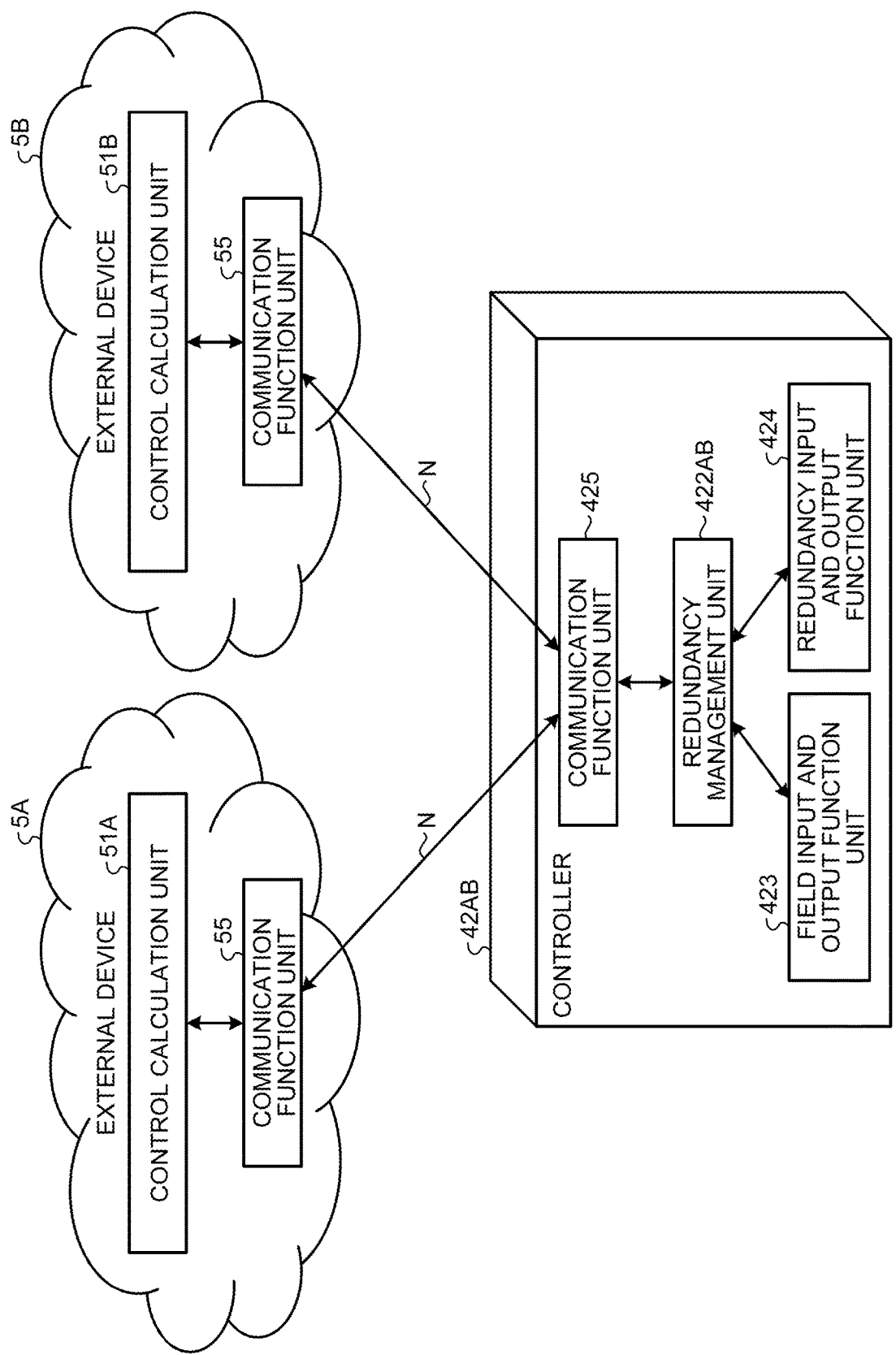
FIG. 7 is a diagram illustrating an example of a schematic configuration of a controller and external devices, according to a modified example.

FIG. 7 is a diagram illustrating an example of a schematic configuration of a controller and external devices according to a modified example. A controller 42AB is capable of communicating with each of two external devices that are an external device 5A and an external device 5B. A control calculation unit 51A of the external device 5A and a control calculation unit 51B of the external device 5B execute different sets of control calculation. For example, a redundancy management unit 422AB of the controller 42AB is capable of obtaining a result or results of control calculation by at least one of the control calculation unit 51A and the control calculation unit 51B from the external device 5A and/or the external device 5B. This increase in variety of the calculation functions increases the potential of process control. The redundancy management unit 422AB may be capable of obtaining results of control calculation by both the control calculation unit 51A and the control calculation unit 51B. Sophistication of the calculation functions and increase in the calculation speed are thereby enabled. Three or more different sets of control calculation may be able to be executed. In this case, the redundancy management unit 422AB is capable of obtaining a result or results of at least one of the plural different sets of control calculation. Functions of plural external devices (such as the external device 5A and the external device 5B) may be integrated into a single external device.

The example where two controllers, the controller 41 and the controller 42, are used as the redundant configuration has been described with respect to the embodiment described above. However, a redundant configuration may be implemented by three or more controllers.

Figure 8:
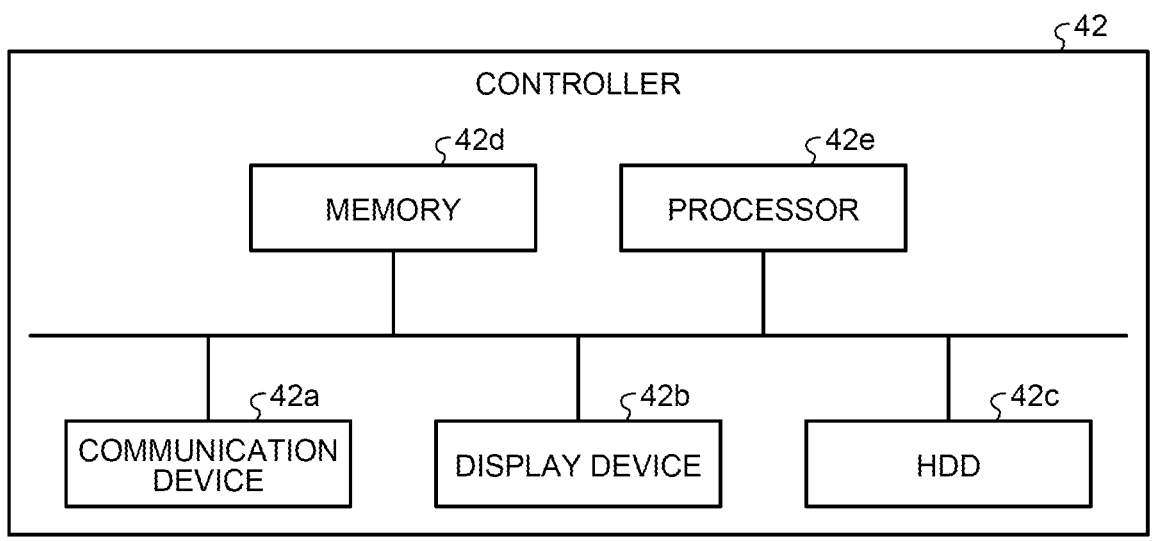
FIG. 8 is a diagram illustrating an example of a hardware configuration of a controller.

FIG. 8 is a diagram illustrating an example of a hardware configuration of a controller. This hardware configuration includes a communication device 42a, a display device 42b, a hard disk drive (HDD) 42c, a memory 42d, and a processor 42e that are connected to one another via a bus, for example.

The communication device 42a is a network interface card, for example, and enables communication with another device. The display device 42b is, for example, a touch panel or a display. The HDD 42c functions as a storage unit, such as an internal memory, and stores therein, for example, a program (a redundancy generation program or a control program) for executing processing by the controller 42.

The processor 42e implements functions of the controller 42 by reading the above mentioned program from the HDD 42c, for example, and loading the program into the memory 42d. These functions include the above described functions of the redundancy management unit 422, field input and output function unit 423, and redundancy input and output function unit 424.

The program may be distributed via a network, such as the Internet. Furthermore, the program may be executed by being recorded in a computer-readable recording medium, such as a hard disk, a flexible disk (FD), a CD-ROM, a magneto-optical disk (MO), or a digital versatile disc (DVD), and being read from the recording medium by a computer.

Devices other than the controller 42, such as, for example, the controller 41, the external device 5, and the terminal device 6, may include a hardware configuration similar to the hardware configuration described above.

The above described techniques are specified as follows, for example. The controller 42 described by reference to FIG. 1 to FIG. 5, for example, is a controller forming, with the controller 41 (another controller), the redundant controller 4. The controller 42 includes the communication function unit 425 and the redundancy management unit 422. The communication function unit 425 performs communication with the external device 5 that is capable of executing control calculation needed for process control for the plant 1. The redundancy management unit 422 switches states of the controller 42 between an active state where a result of the control calculation obtained from the external device 5 via the communication function unit 425 is reflected in the process control and a standby state where the result of the control calculation is not reflected in the process control. The redundancy management unit 422 switches between states of the controller 42 to bring one of the controller 42 and the controller 41 into the active state.

The above described controller 42 enables implementation of the calculation function by the external device 5, the calculation function being needed for process control for the plant 1. Cost of the controller 42 is thus able to be reduced. Using a general-purpose computer, for example, as the external device 5 increases the possibility of reduction in cost for control calculation. Therefore, cost for redundancy generation in a controller is able to be reduced. Furthermore, installation of the redundancy management unit 422 in the controller 42 enables high-speed switching between states of the controller 41 and the controller 42.

The controller 42 may be temporarily utilized to form the redundant controller 4. Cost of the controller 42 is reduced as described above, and thus the controller 42 is able to be used suitably for such temporary utilization.

The plural states include the stopped state where no result of control calculation is obtained, and the redundancy management unit 422 may switch the controller 42 between the standby state and the stopped state any time when the controller 41 is in the active state. In this case, fees may be set according to utilization of the external device 5. Setting fees according to temporary utilization of the controller 42 increases the possibility of further reduction in cost for redundancy generation.

The redundancy management unit 412 may copy data needed for control calculation from the controller 41 to the controller 42, transmit the data copied, to the external device 5 via the communication function unit 425, and obtain a result of the control calculation from the external device 5.

Enabling the controller 41 and the controller 42 to obtain calculation results based on the same data as described above enables a redundant configuration to be obtained, for example.

As described by reference to FIG. 7, for example, the external devices 5 (for example, the external device 5A and the external device 5B) may be capable of executing plural different sets of control calculation, and the redundancy management unit 422AB may be capable of obtaining a result or results of at least one of the plural different sets of control calculation from the external devices 5 via the communication function unit 425. A larger variety of control functions is thereby provided, the potential of process control for the plant 1 is thus increased, and sophistication of the calculation functions and increase in the calculation speed are thus enabled.

The control method described by reference to FIG. 2 to FIG. 5 is also one of embodiments. The control method is a control method executed by the controller 42 forming, with the controller 41 (another controller), the redundant controller 4. This control method includes performing communicating with the external device 5 that is capable of executing control calculation needed for process control of the plant 1 (Steps S2, S5, S15, S30, S42, S50, S62, S73, S86, S92, and S92X, for example) and switching states of the controller 42 between plural states including the active state where a result of the control calculation obtained from the external device 5 via the communication is reflected in the process control and the standby state where a result of the control calculation is not reflected in the process control (Step S90, for example). In the switching, the states of the controller 42 are switched to bring one of the controller 42 and the controller 41 into the active state. Such a control method also enables reduction in cost for providing redundancy in a controller, as described above.

In the control method, the controller 42 may be temporarily utilized to form the redundant controller 4, as described above. The plural states include the stopped state where no result of control calculation is obtained, and in the switching, the controller 42 may be switched between the standby state and the stopped state at any time when the controller 41 is in the active state. Fees may be set according to utilization of the external device 5. In obtaining a result of control calculation, data needed for the control calculation is copied from the controller 41 to the controller 42, the data copied is transmitted to the external device 5, and the result of the control calculation may be obtained from the external device 5. The external devices 5 (for example, the external device 5A and the external device 5B) may be capable of executing plural different sets of control calculation and in the switching, a result or results of at least one of the plural different sets of control calculation may be obtainable from the external devices 5 via communication.

What is claimed is:

1. A control device comprising:
a first controller executing control calculation needed for process control for a plant and performing the process control by reflecting the executed control calculation in the process control;
a second controller forming a redundant controller with the first controller, wherein the second controller does not have any control calculation function which executes the control calculation needed for the process control for the plant in the second controller;
an external device connected to the second controller via a network and executing control calculation of the second controller;
the first controller being configured to switch states of the first controller between a plurality of states including an active state where a result of control calculation is reflected in the process control and a standby state where the result of the control calculation is not reflected in the process control; and
the second controller being configured to switch states of the second controller between the plurality of states including the active state and the standby state, and communicate with the external device, wherein
the second controller is further configured to switch the states of the second controller to the active state by obtaining the result of the control calculation executed by the external device and reflecting the obtained result of the control calculation in the process control,
wherein the second controller is configured to perform the process control only by (i) receiving the control calculation from the external device and (ii) reflecting the received control calculation in the process control,
wherein the plural states include a stopped state where the result of the control calculation is not obtained, and
the second controller comprises a redundancy management unit configured to switch the second controller between the standby state and the stopped state at any time when the first controller is in the active state,
wherein the redundancy management unit of the second controller detects an abnormality of the first controller, and sends an abnormality notification to the external device to cause the external device to stand by for processing,
determines whether the second controller is able to be switched to the active state to shift control from the first controller to the second controller,
when the answer is affirmative, switches the second controller to the active state, and
notifies the external device of control resumption to cause the external device to resume the control calculation.

2. The control device according to claim 1, wherein the second controller is configured to be temporarily utilized to form the redundant controller.

3. The control device according to claim 1, wherein a fee is set according to utilization of the external device.

4. The control device according to claim 1, wherein the redundancy management unit is configured to copy data needed for the control calculation from the first controller to the second controller, to transmit the copied data to the external device via a communication function unit and to obtain the result of the control calculation from the external device.

5. The control device according to claim 4, wherein
the external device is capable of executing plural different sets of control calculation, and
the redundancy management unit is capable of obtaining a result or results of at least one of the plural different sets of control calculation, from the external device, via the communication function unit.

6. The control device according to claim 1, wherein the second controller is further configured to switch the state of the second controller to the standby state by not reflecting the result of the control calculation executed by the external device in the process control.

7. The control device according to claim 1, wherein the first controller and the second controller are connected with each other through a hardware bus.

8. A control method of a control system comprising:
a first controller executing control calculation needed for process control for a plant and performing the process control by reflecting the executed control calculation in the process control;
a second controller forming a redundant controller with the first controller, and
an external device connected to the second controller via a network and executing control calculation of the second controller,
wherein the second controller does not have any control calculation function which executes the control calculation needed for the process control for the plant in the second controller, the control method including:
switching, by the first controller, states of the first controller between a plurality of states including an active state where a result of control calculation is reflected in process control and a standby state where the result of the control calculation is not reflected in the process control; and
switching, by the second controller, states of the second controller between the plurality of states including the active state and the standby state, and communicating with the external device,
wherein
the switching further comprises switching, by the second controller, the states of the second controller to the active state by obtaining the result of the control calculation executed by the external device and reflecting the obtained result of the control calculation in the process control,
wherein the control method further includes performing by the second controller the process control only by (i) receiving the control calculation from the external device and (ii) reflecting the received control calculation in the process control,
wherein the plural states include a stopped state where the result of the control calculation is not obtained, and the second controller comprises a redundancy management unit configured to switch the second controller between the standby state and the stopped state at any time when the first controller is in the active state,
the control method further comprises:
by the redundancy management unit of the second controller, detecting, an abnormality of the first controller, and sending an abnormality notification to the external device to cause the external device to stand by for processing,
determining whether the second controller is able to be switched to the active state to shift control from the first controller to the second controller,
when the answer is affirmative, switching the second controller to the active state, and
notifying the external device of control resumption to cause the external device to resume the control calculation.

9. The control method according to claim 8, wherein the second controller is temporarily utilized to form the redundant controller.

10. The control method according to claim 8, wherein a fee is set according to utilization of the external device.

11. The control method according to claim 8, wherein in obtaining the result of the control calculation, data needed for the control calculation is copied from the first controller to the second controller, the data copied is transmitted to the external device, and the result of the control calculation is obtained from the external device.

12. The control method according to claim 8, wherein
the external device is capable of executing plural different sets of control calculation, and
in the switching, a result or results of at least one of the plural different sets of control calculation is/are able to be obtained from the external device via the communication.

* * * * *